US012578024B2

(12) United States Patent
Aoyama et al.

(10) Patent No.: US 12,578,024 B2
(45) Date of Patent: Mar. 17, 2026

(54) FLUID CONTROL VALVE

(71) Applicant: CKD CORPORATION, Komaki (JP)

(72) Inventors: Tatsuhito Aoyama, Komaki (JP);
Shinya Takahashi, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 18/766,737

(22) Filed: Jul. 9, 2024

(65) Prior Publication Data

US 2025/0027570 A1     Jan. 23, 2025

(30) Foreign Application Priority Data

Jul. 18, 2023     (JP) ................................. 2023-116895

(51) Int. Cl.
F16K 25/00 (2006.01)
F16K 1/42 (2006.01)
F16K 7/17 (2006.01)
F16K 1/46 (2006.01)
F16K 31/122 (2006.01)

(52) U.S. Cl.
CPC .............. F16K 7/17 (2013.01); F16K 25/005 (2013.01); F16K 1/425 (2013.01); F16K 1/465 (2013.01); F16K 31/1221 (2013.01)

(58) Field of Classification Search
None
See application file for complete search history.

(56) References Cited

U.S. PATENT DOCUMENTS

| | | | | | |
|---|---|---|---|---|---|
| 2,847,182 | A | * | 8/1958 | Maucusi, Jr. ............. | F16K 1/34 251/297 |
| 3,131,906 | A | * | 5/1964 | King ....................... | F16K 1/425 251/315.08 |
| 3,809,362 | A | * | 5/1974 | Baumann ................ | F16K 1/425 137/902 |
| 3,960,364 | A | * | 6/1976 | Hargrave ................ | F16K 1/425 251/210 |
| 4,064,904 | A | * | 12/1977 | Tolnai ................... | F16K 31/508 137/454.5 |
| 4,671,490 | A | * | 6/1987 | Kolenc ................... | F16K 41/12 251/267 |
| 5,485,984 | A | * | 1/1996 | Itoi .......................... | F16K 7/16 251/363 |

(Continued)

FOREIGN PATENT DOCUMENTS

| | | |
|---|---|---|
| JP | 2016-180490 A | 10/2016 |
| JP | 2017-223318 A | 12/2017 |

OTHER PUBLICATIONS

Dec. 4, 2025 Office Action issued in Korean Application No. 2024-0088872.

*Primary Examiner* — Matthew W Jellett
(74) *Attorney, Agent, or Firm* — Oliff PLC

(57) ABSTRACT

A fluid control valve includes a pressing member, a diaphragm member, and a valve seat. The pressing member presses and deforms the diaphragm member into contact with the valve seat. The valve seat includes a first annular valve seat made of fluorine resin and a second annular valve seat made of heat-resistant resin, which are arranged concentrically adjacent to each other. The heat-resistant resin has a higher deflection temperature under load at 1.82 MPa than the fluorine resin, measured according to ASTM D-648.

4 Claims, 7 Drawing Sheets

(56)  References Cited

U.S. PATENT DOCUMENTS

| | | | |
|---|---|---|---|
| 8,256,744 B2 * | 9/2012 | Tanikawa | F16K 31/1225 |
| | | | 251/368 |
| 8,960,644 B2 * | 2/2015 | Aoyama | F16K 1/425 |
| | | | 251/333 |
| 10,933,614 B2 * | 3/2021 | Kitayama | C08J 5/18 |
| 11,506,295 B2 * | 11/2022 | Sato | F16K 27/003 |
| 11,982,361 B2 * | 5/2024 | Homma | F16K 1/427 |
| 2003/0085532 A1 * | 5/2003 | Spiegl | F04B 39/1073 |
| | | | 277/650 |
| 2005/0211944 A1 * | 9/2005 | Tutt | F16K 7/14 |
| | | | 251/331 |
| 2006/0118752 A1 * | 6/2006 | Tin-Kai | F16K 7/16 |
| | | | 251/331 |
| 2006/0175573 A1 * | 8/2006 | Ohmi | F16K 51/02 |
| | | | 251/331 |
| 2010/0090151 A1 | 4/2010 | Tanikawa et al. | |
| 2011/0079427 A1 * | 4/2011 | Powale | H01B 3/427 |
| | | | 174/72 A |
| 2012/0097881 A1 * | 4/2012 | Aoyama | F16K 1/425 |
| | | | 251/359 |
| 2014/0000731 A1 * | 1/2014 | Sciuto | F16K 15/021 |
| | | | 137/613 |
| 2014/0166918 A1 * | 6/2014 | Kropf | F16K 7/12 |
| | | | 251/368 |
| 2014/0319403 A1 * | 10/2014 | Kitano | F16K 7/14 |
| | | | 251/331 |
| 2016/0258538 A1 * | 9/2016 | Liu | F16K 1/465 |
| 2017/0184971 A1 * | 6/2017 | Johnson | C08G 64/40 |
| 2018/0106385 A1 | 4/2018 | Funakoshi et al. | |
| 2019/0031845 A1 | 1/2019 | Kitayama et al. | |
| 2019/0128433 A1 | 5/2019 | Aoyama | |
| 2021/0332900 A1 * | 10/2021 | Sato | F16K 31/1225 |

* cited by examiner

FLUID CONTROL VALVE

CROSS-REFERENCE TO RELATED APPLICATIONS

This application is based upon and claims the benefit of priority to Japanese Patent Application No. 2023-116895 filed on Jul. 18, 2023, the entire contents of which are incorporated herein by reference.

BACKGROUND

Technical Field

The disclosure relates to a fluid control valve including a pressing member, a diaphragm member, and a valve seat, in which the pressing member presses and deforms the diaphragm member to bring the diaphragm member into contact with the valve seat.

Related Art

In a semiconductor manufacturing process, multiple different types of process gasses are used for a deposition treatment. To control a flow rate of each of those process gases, fluid control valve is used. Such a fluid control valve is known as for example, fluid control valves disclosed in Japanese unexamined patent application publication Nos. 2016-180490 (JP2016-180490A) and 2017-223318 (JP2017-223318A). The fluid control valve disclosed in JP2016-180490A is an air-operated open/close valve, which controls a flow rate of a process gas by bringing a diaphragm member into contact with or away from contact from a valve seat.

The detailed configuration of the above conventional valve will be described below referring to FIG. 5 to FIG. 7. FIG. 5 is a cross-sectional view of a fluid control valve 100 according to a conventional art, showing its valve open state. FIG. 6 is a cross-sectional view of the fluid control valve 100 in a valve closed state. FIG. 7 is an enlarged view of a part C in FIG. 6.

In the fluid control valve 100, as shown in FIG. 5, a stem 32 is placed in contact with a top surface of a diaphragm member 34 formed in a spherical crown-like shape. The diaphragm member 34 is pressed downward in the figure and deformed by the stem 32 under the operation of an actuator unit 4 (e.g., an air cylinder) and the urging force of a compression spring 52 mounted in a spring unit 5, and is brought into contact with an annular valve seat 101. As shown in FIG. 6, the fluid control valve 100 with the diaphragm member 34 in contact with the valve seat 101 is in the valve closed state. When the diaphragm member 34 is released from the pressure applied by the stem 32, the diaphragm member 34 then returns to its original spherical crown-like shape by self-returning force, separating from the valve seat 101. As shown in FIG. 5, the fluid control valve 100 with the diaphragm member 34 separated from the valve seat 101 is in the valve open state.

Process gasses used in atomic layer deposition (ALD), which is a film deposition technique widely used recently, may exceed 250° C. In this case, both the diaphragm member 34 and the valve seat 101 may be made of metal to ensure heat resistance.

SUMMARY

Technical Problems

When both the diaphragm member 34 and the valve seat 101 are made of metal, the diaphragm member 34 comes into contact the valve seat 101 by metal-to-metal contact, which is apt to cause abrasive wear. In particular, a fluid control valve 100 used in ALD requires to repeat contacting and separating operations at very high frequencies and thus may need to be replaced with a new one in a few months from the start of use of the fluid control valve 100.

To prevent abrasive wear due to the metal-to-metal contact, the valve seat 101 could be made of fluorine resin with excellent chemical resistance. However, the deflection temperature under load (DTUL) of the fluorine resin at 1.82 MPa, measured according to ASTM D-648, is about 50° C., and thus the valve seat 101 is easily deformed under high temperature conditions where the temperature of a process gas is 250° C. or higher. Therefore, if the diaphragm member 34 repeatedly contacts with and separates from the valve seat 101 made of fluorine resin under the high temperature conditions, the valve seat 101 may be depressed or collapsed beyond its designed value by the diaphragm member 34, for example as shown in FIG. 7, which may decrease the dimension in the contacting and separating direction (namely, the height of the valve seat). If the valve seat 101 is excessively depressed or collapsed as above, the surface pressure of the diaphragm member 34 in contacting with the valve seat 101 becomes lower, which causes a deterioration in the sealing performance of the fluid control valve 100. In addition, if the height of the valve seat 101 is decreased, the amount of deformation (i.e., the stroke distance) of the diaphragm member 34 until contacting the valve seat 101 to bring the fluid control valve 100 from the valve open state to the valve closed state becomes larger than the designed value. If the deformation amount of the diaphragm member 34 is greater than the designed value, the diaphragm member 34 may be prone to cause fatigue failure.

The present disclosure has been made to address the above problems and has a purpose to provide a fluid control valve capable of suppressing deformation of an annular valve seat even under high temperature conditions to prevent deterioration in sealing performance and prevent fatigue failure of a diaphragm member.

Means of Solving the Problems

To achieve the above-mentioned purpose, one aspect of the present disclosure provides a fluid control valve configured as below.

(1) In a fluid control valve, a fluid control valve comprises: a pressing member; a diaphragm member; and a valve seat, the fluid control valve being configured to press and deform the diaphragm member by the pressing member to bring the diaphragm member into contact with the valve seat, wherein the valve seat includes a first annular valve seat made of fluorine resin and a second annular valve seat made of heat-resistant resin, which are positioned concentrically adjacent to each other, and the heat-resistant resin has a higher deflection temperature under load at 1.82 MPa than the fluorine resin, measured according to ASTM D-648.

According to the fluid control valve described in (1), the sealing performance in the valve closed state is ensured mainly by the first annular valve seat made of fluorine resin. This is because the first annular valve seat, which is made of fluorine resin, can fit well into, or conform to, the contour of the diaphragm member when the diaphragm member 34 comes into contact therewith, and exhibit good transfer property. The second annular valve seat is made of a heat-resistant resin having a higher load deflection temperature than that of fluorine resin, and thus is less likely to be deformed as compared with the fluorine resin even under the high temperature conditions. Therefore, the second annular valve seat mainly functions to receive the load applied by the diaphragm member. Since the second annular valve seat receives the load applied by the diaphragm member at the position adjacent to the first annular valve seat, the first annular valve seat is suppressed from being excessively depressed or collapsed by the applied load. This configuration can suppress an increase in the deformation amount (i.e., the stroke distance) of the diaphragm member until contacting the annular valve seat due to depression or collapse of the valve seat and hence prevent the deterioration in the sealing performance of the fluid control valve and the fatigue failure of the diaphragm member. Fluoride resin may include perfluoroalkoxyalkane (PFA), polytetrafluoroethylene (PTFE) and perfluoroelastomer (FFKM), for example.

(2) In the fluid control valve described in the above configuration (1), the deflection temperature under load of the heat-resistant resin at 1.82 MPa may be 125° C. or higher, measured according to ASTM D-648.

(3) In the fluid control valve described in the above configuration (1) or (2), the heat-resistant resin may be polyetheretherketone (PEEK), polyetherketone (PEK), polybenzimidazole (PBI), polyimide (PI), or high heat-resistant polyamide (PA).

The fluid control valve configured as above in the above configuration (2) or (3) can suppress deformation of the second annular valve seat even under the higher temperature conditions in which the temperature of process gas is 250° C. or higher. Thus, the second annular valve seat can reliably receive the load applied by the diaphragm member, so that the first annular valve seat is reliably suppressed from becoming excessively depressed or collapsed.

Advantageous Effects

The fluid control valve of the disclosure can suppress deformation of a valve seat even under high temperature conditions and hence can prevent the deterioration in sealing performance and the fatigue failure of a diaphragm member.

BRIEF DESCRIPTION OF THE DRAWINGS

FIG. 2 is an enlarged view of a part A in FIG. 1;

FIG. 4 is an enlarged view of a part B in FIG. 1;

DETAILED DESCRIPTION OF THE
EXEMPLARY EMBODIMENTS

Figure 1:
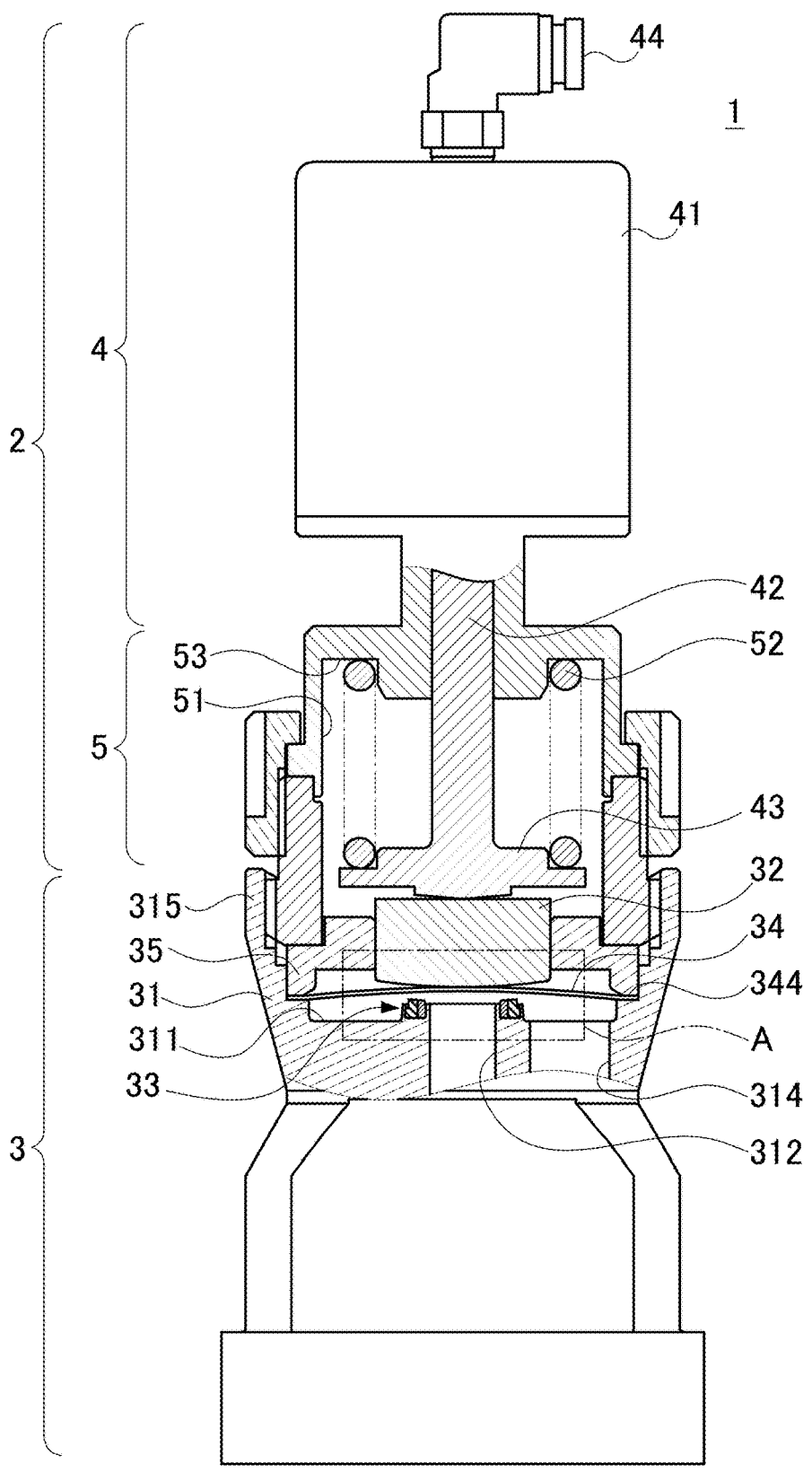
FIG. 1 is a vertical cross-sectional view of a fluid control valve in an embodiment, showing a valve open state.
Figure 2:
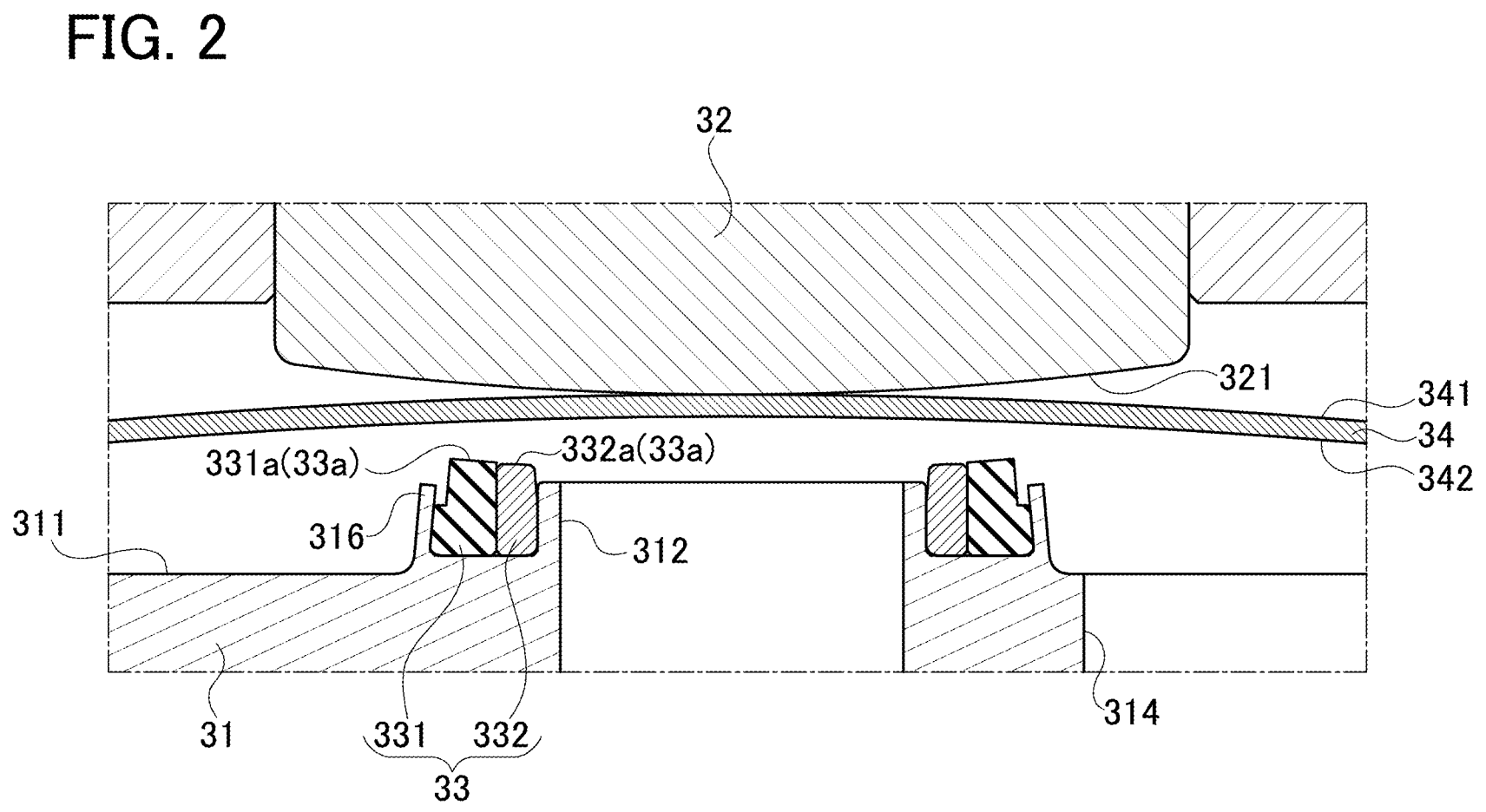
Figure 3:
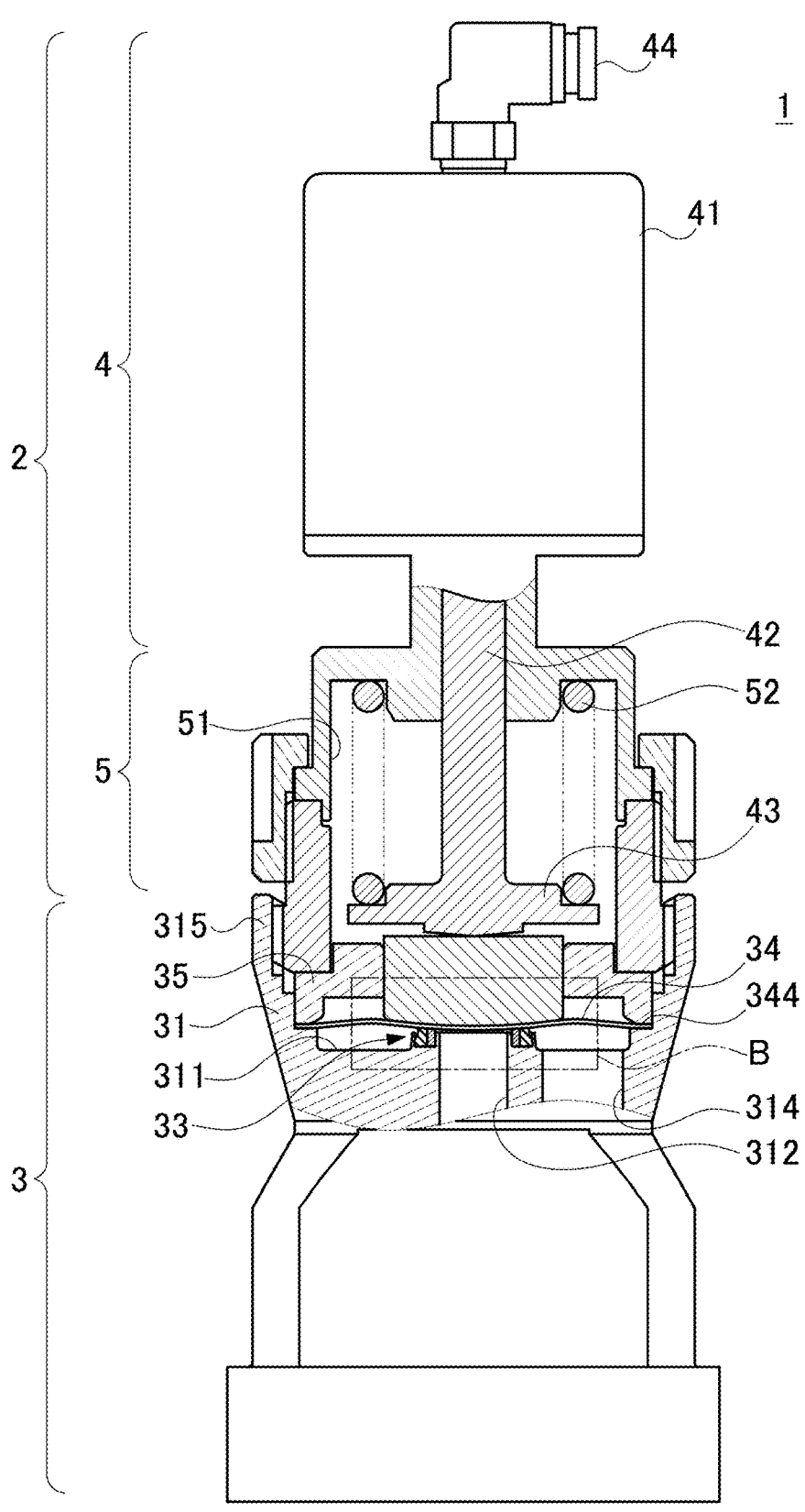
FIG. 3 is the vertical cross-sectional view of the fluid control valve in the embodiment, showing a valve closed state.
Figure 4:
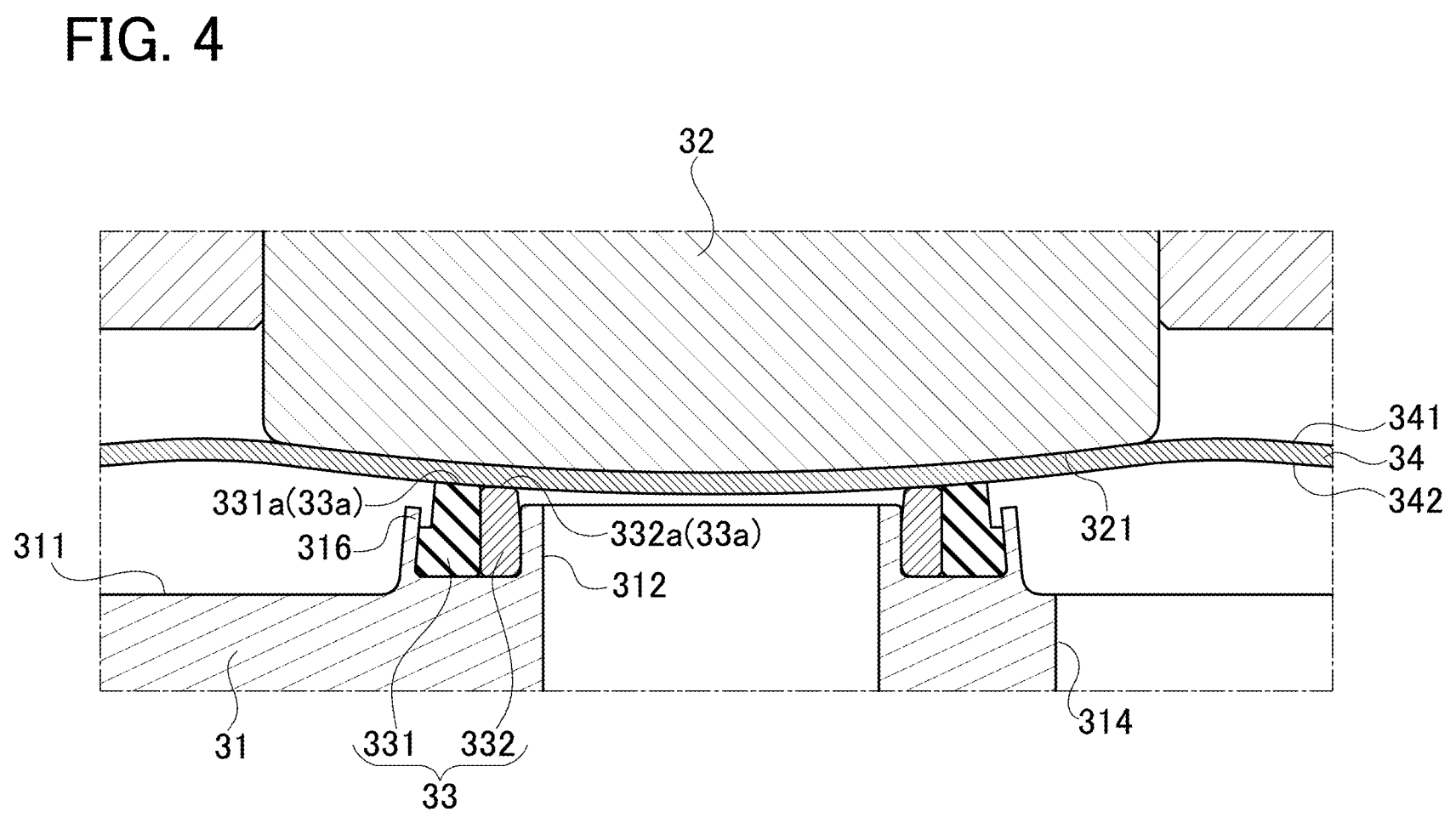
Figure 5:
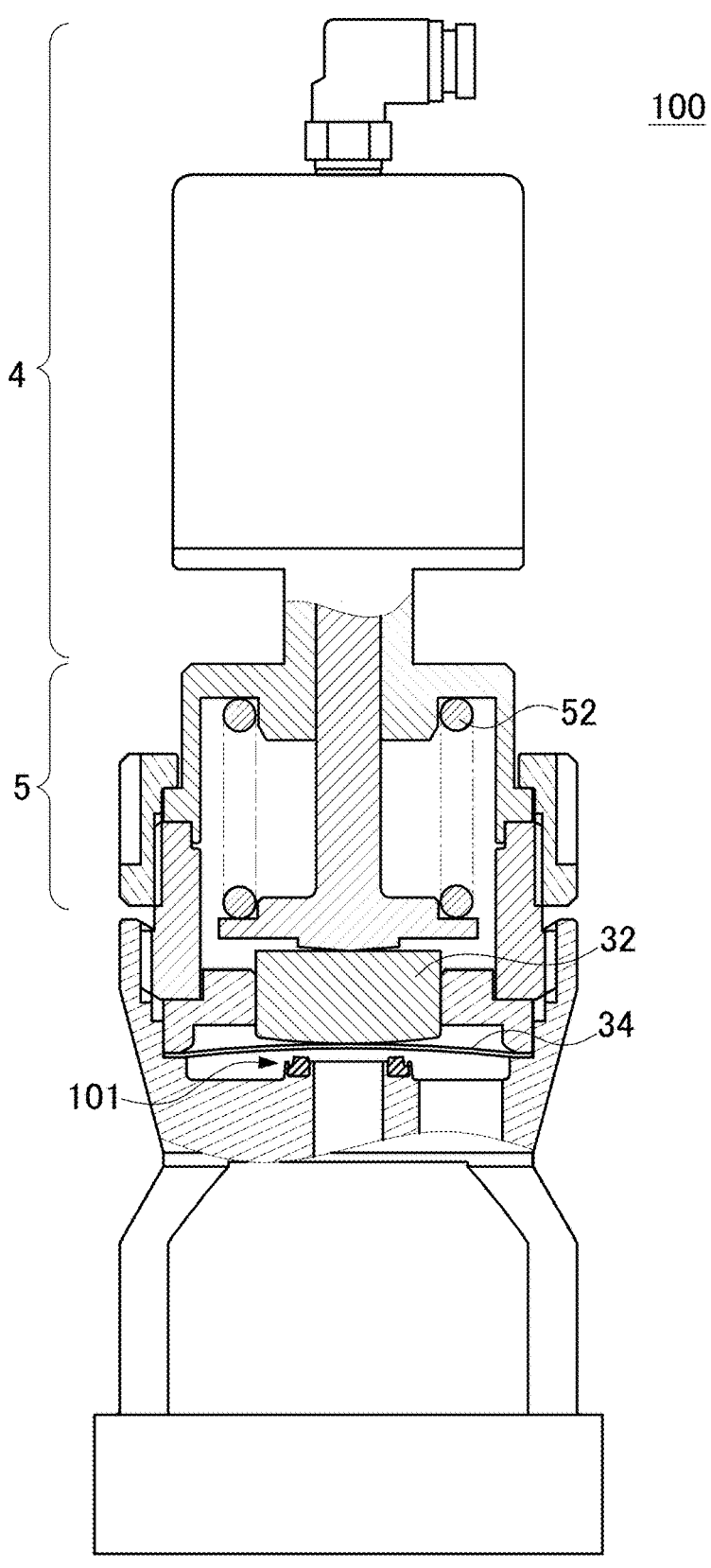
FIG. 5 is a vertical cross-sectional view of a conventional fluid control valve, showing a valve open state.
Figure 6:
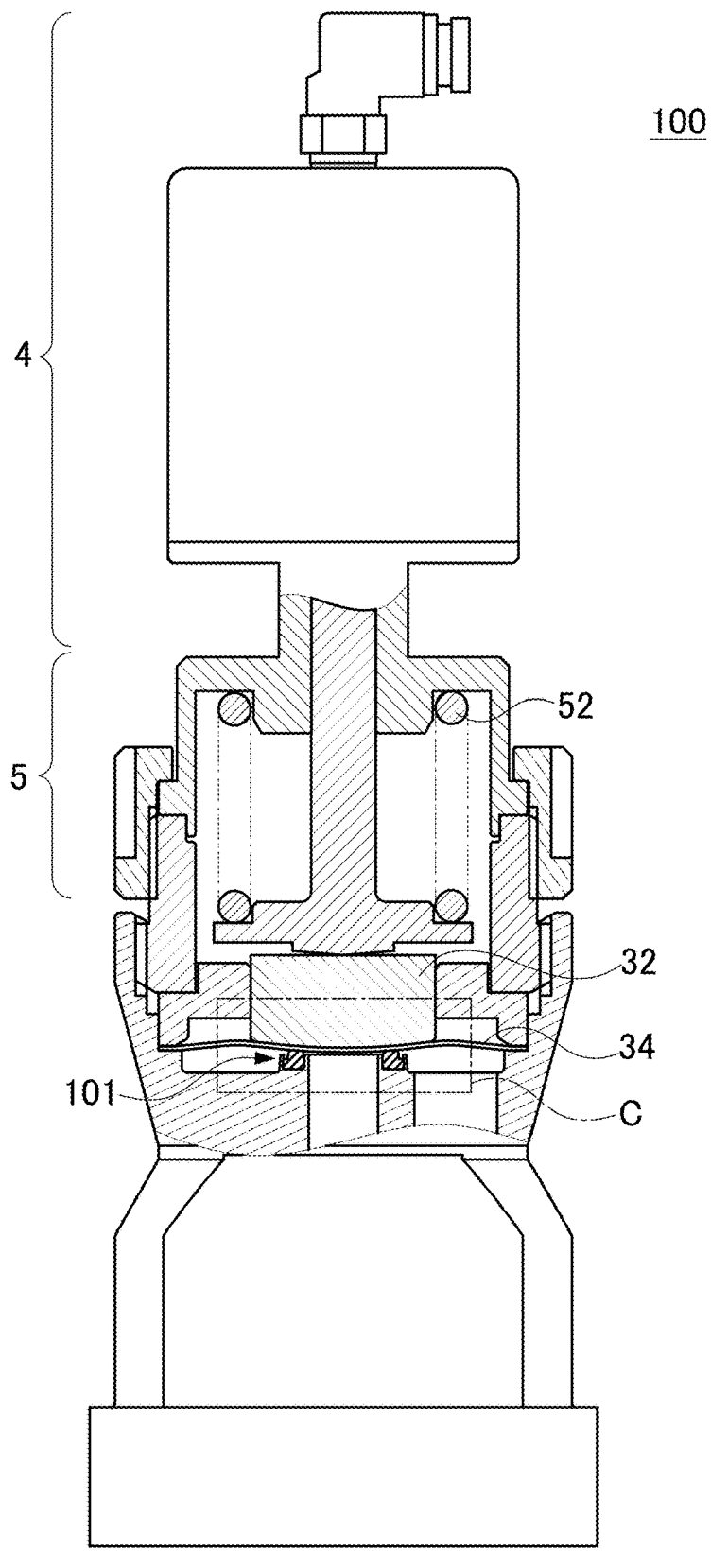
FIG. 6 is the vertical cross-sectional view of the conventional fluid control valve, showing a valve closed state.
Figure 7:
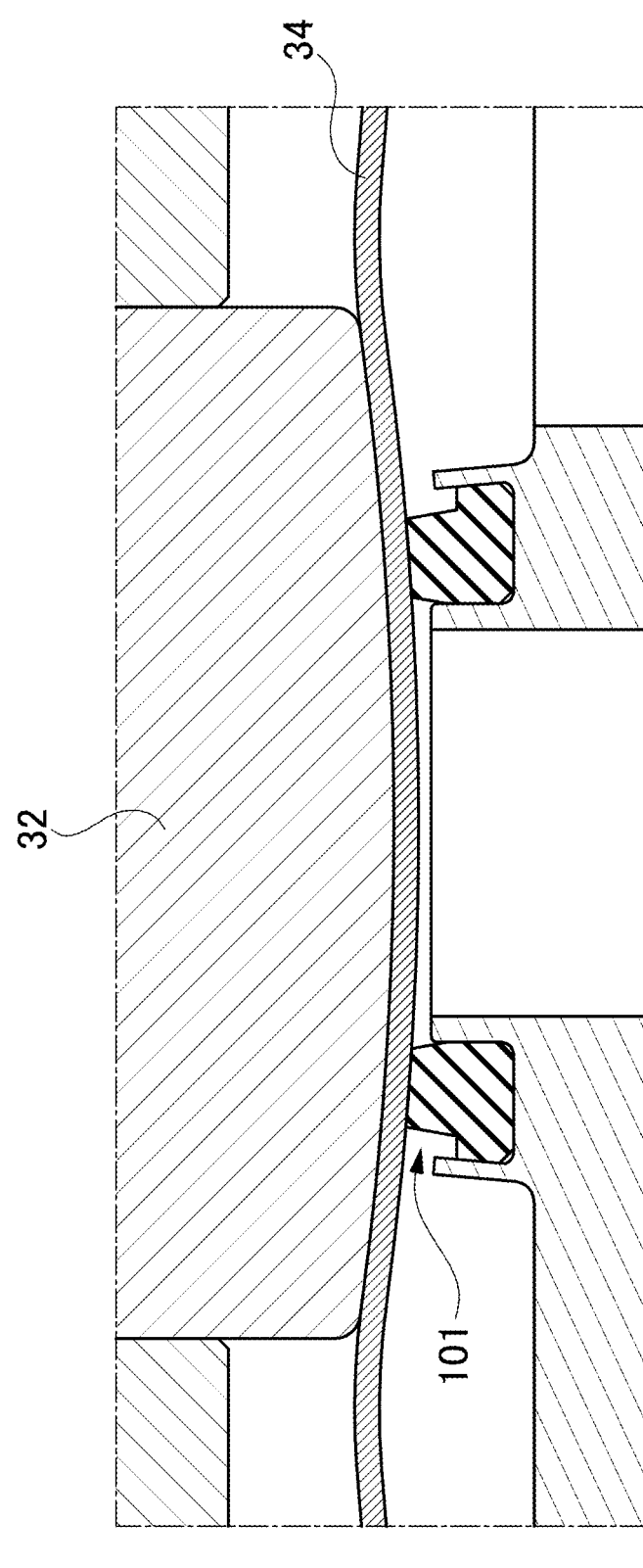
FIG. 7 is an enlarged view of a part C in FIG. 6.

A detailed description of an embodiment of a fluid control valve of the disclosure will now be given referring to the accompanying drawings, which are simplified for easy illustration and do not accurately represent the actual shapes, sizes, and others.
Configuration of Fluid Control Valve The configuration of a fluid control valve 1 in the embodiment will be described below referring to the drawings. FIG. 1 is a cross-sectional view of the fluid control valve 1 in a valve open state, and FIG. 2 is an enlarged view of a part A in FIG. 1. FIG. 3 is a cross-sectional view of the fluid control valve 1 in a valve closed state, and FIG. 4 is an enlarged view of a part B in FIG. 3.

The fluid control valve 1 is a gas valve, which is installed in a gas supply system of a semiconductor manufacturing device and used to control supply of process gases at high temperatures (e.g., about 250° C.). This fluid control valve 1 is a normally-closed air-operated open/close valve and includes a driving unit 2 and a valve unit 3 as shown in FIG. 1. The driving unit 2 is provided with an actuator unit 4 and a spring unit 5.

Firstly, the actuator unit 4 is described below. This actuator unit 4 is a pneumatically-actuated air cylinder and includes a cylindrical case 41, a piston (not shown) installed inside the case 41, and a columnar driving shaft 42 coupled to the piston. Further, the actuator unit 4 is provided with a pilot port 44 on an opposite end (an upper end in FIG. 1) of the case 41 from the spring unit 5 to allow operating air to enter in the case 41.

The piston is arranged to be slidable up and down within the case 41 in response to supply or stop of the operating air into the case 41 through the pilot port 44. In accordance with upward/downward movement of the piston, the driving shaft 42 is moved backward/forward in the axial direction thereof. The axial direction of the driving shaft 42 is parallel to the upward/downward direction in FIG. 1 and coincides with the direction in which a diaphragm member 34, described later, contacts with or separates from the valve seat 33. In the embodiment, the upward direction in the figures is a separating direction and the downward direction in the figures is a contacting direction.

One end of the driving shaft 42 (i.e., a lower end in FIG. 1) on the valve unit 3 side protrudes out of the actuator unit 4, extending into the spring unit 5. The driving shaft 42 located inside the spring unit 5 is provided, at its distal end, with a first stem 43. Accordingly, in association with forward/backward movement of the driving shaft 42, the first stem 43 is also moved in the same direction as the driving shaft 42. The first stem 43 is in contact with a second stem 32, described later, on an end face opposite from the driving shaft 42. Thus, when the first stem 43 is driven in the contacting direction, the first stem 43 presses the second stem 32 in the contacting direction.

Secondly, the spring unit 5 is described below. This spring unit 5 is provided with a compression spring 52 positioned coaxial with driving shaft 42 in the internal space 51. The compression spring 52 is compressed between an end face 53 of the internal space 51 on the actuator unit 4 side and the first stem 43. Therefore, the compression spring 52 always urges the first stem 43 in the contacting direction, i.e., the downward direction in the figures.

Thirdly, the valve unit 3 will be described below. This valve unit 3 is provided with a body 31, the second stem 32 (one example of a pressing member), the valve seat 33, and the diaphragm member 34. The body 31 includes a cylindrical portion 315 connected to the spring unit 5. The body 31 is further formed with a valve chamber 311 inside the cylindrical portion 315.

The valve chamber 311 is provided, at the center of the bottom, with a valve port 312 through which a process gas flows in the valve chamber 311. On the bottom surface of the valve chamber 311, the annular valve seat 33 is fixed on the outer circumferential side of the valve port 312 and coaxially with the valve port 312. Further, the valve chamber 311 is communicated with an outflow channel 314 on the radially outside of the valve seat 33. This outflow channel 314 is used to flow the process gas out of the valve chamber 311.

The second stem 32 is made of stainless steel, for example. This second stem 32 has a substantially circular columnar shape with a spherical surface 321, which is an opposed surface (a lower end surface in the figures) facing the diaphragm member 34 and bulging toward the diaphragm member 34. The second stem 32 is retained by a holder 35 so that the spherical surface 321 remains contact with the diaphragm member 34 and the second stem 32 is movable upward and downward.

The diaphragm member 34 is made of Ni alloy, for example. The diaphragm member 34 has a spherical crown-like shape bulging toward the second stem 32. Accordingly, an opposed surface 341 of the diaphragm member 34, facing the second stem 32, is spherical. The other surface of the diaphragm member 34, opposite the opposed surface 341, is a back surface 342 which contacts with or separates from the valve seat 33. The diaphragm member 34 is provided, at its outer circumferential edge, with a flat edge portion 344 extending perpendicular to the contacting and separating direction. This edge portion 344 is sandwiched between the holder 35 and the body 31, fixing the diaphragm member 34 in the valve chamber 311. When the diaphragm member 34 fixed as above is pressed downward by the second stem 32, the central portion of the diaphragm member 34 is elastically deformed along the spherical surface 321 of the second stem 32 in the contacting direction (i.e., the downward direction) (see FIG. 3 and FIG. 4). On the other hand, when the pressure of the second stem 32 is released, the diaphragm member 34 returns to its original spherical crown-like shape by its own resilient force (see FIG. 1 and FIG. 2).

The valve seat 33 consists of a first annular valve seat 331 made of fluorine resin and a second annular valve seat 332 made of heat-resistant resin. The fluorine resin that forms the first annular valve seat 331 may include perfluoroalkoxyalkane (PFA), polytetrafluoroethylene (PTFE) and perfluoroelastomer (FFKM), for example. The heat-resistant resin that forms the second annular valve seat 332 may be selected from resins whose deflection temperature under load at 1.82 MPa, as measured according to ASTM D-648, which will be simply referred to as a "load deflection temperature", is higher than the load deflection temperature of the fluorine resin, which is about 50° C. to 55° C., and further the load deflection temperature of the heat-resistant resin may be 125° C. or higher. Specifically, such heat-resistant resin may include polyetheretherketone (PEEK), polyetherketone (PEK), polybenzimidazole (PBI), polyimide (PI), heat-resistant polyamide (PA), for example. The load deflection temperature of PEEK is 155° C., the load deflection temperature of PEK is 180° C., the load deflection temperature of PBI is 410° C., the load deflection temperature of PI is 360° C., and the load deflection temperature of PA is 125° C.

The first annular valve seat 331 and the second annular valve seat 332 each have an annular shape and are arranged concentrically adjacent to each other. To be specific, the first annular valve seat 331 is positioned on the outer circumferential side and the second annular valve seat 332 is positioned on the inner circumferential side so that the inner peripheral surface of the first annular valve seat 331 and the outer peripheral surface of the second annular valve seat 332 are in contact with each other. A swaged portion 316 provided in the body 31 presses the first annular valve seat 331 from the outer circumference to fix the first annular valve seat 331 and the second annular valve seat 332 on the bottom surface of the valve chamber 311.

Moreover, since the first annular valve seat 331 and the second annular valve seat 332 are located concentrically adjacent to each other, a top end face 331a of the first annular valve seat 331, facing the diaphragm member 34, and a top end face 332a of the second annular valve seat 332, facing the diaphragm member 34, form a contact surface 33a of the valve seat 33, which the diaphragm member 34 is brought into contact with or separated from. Accordingly, both the first annular valve seat 331 and the second annular valve seat 332 can receive the load applied to the valve seat 33 when the diaphragm member 34 contacts with the valve seat 33.

In the embodiment, the first annular valve seat 331 is located on the outer circumferential side and the second annular valve seat 332 is located on the inner circumferential side, but they may be arranged reversely so that the first annular valve seat 331 is located on the inner circumferential side and the second annular valve seat 332 is located on the outer circumferential side. In the embodiment, the first annular valve seat 331 is positioned on the outer circumferential side and the second annular valve seat 332 is positioned on the inner circumferential side in the embodiment in order to reliably fix the valve seat 33 to the body 31. In more detail, since the swaged portion 316 is located radially outside the valve seat 33, when the swaged portion 316 is swaged to press against the valve seat 33, the swaged portion 316 more easily bites into the valve seat 33 with the first annular valve seat 331 placed on the outer circumferential side, because the first annular valve seat 331 is lower in hardness than the second annular valve seat 332. This can ensure that the valve seat 33 is fixed in place.

Operations of the Fluid Control Valve

Next, the operations of the fluid control valve 1 will be described below.

When operating air is supplied to the actuator unit 4 through the pilot port 44, the piston in the case 41 is moved in the separating direction (i.e., the upward direction in the figures). This causes the driving shaft 42 to move in the same direction. The first stem 43 connected to the driving shaft 42 is also moved upward against the elastic force of the compression spring 52. Thus, the second stem 32 having been pressed down by the first stem 43 is moved upward by the returning force of the diaphragm member 34. The diaphragm member 34 separates from the valve seat 33, so that the fluid control valve 1 is brought into the valve open state shown in FIG. 1. In this valve open state, the process gas flows into the valve chamber 311 through the valve port 312 and then is discharged to the outflow channel 314.

In contrast, when supply of the operating air to the pilot port 44 is stopped, the first stem 43 is caused to move in the contacting direction, i.e., downward in the figures, by the elastic force of the compression spring 52. The first stem 43 presses and moves the second stem 32 in the same direction. In association with the movement of the second stem 32, the diaphragm member 34 is brought into contact with the valve seat 33, so that the fluid control valve 1 is brought into the valve closed state shown in FIG. 3. In this valve closed state, the process gas is blocked from flowing from the valve port 312 to the valve chamber 311.

Operations and Effects (1) As described above, the fluid control valve 1 in the embodiment is provided with the pressing member (e.g., the second stem 32), the diaphragm member 34, and the valve seat 33, and is configured to bring the diaphragm member 34 into contact with the valve seat 33 by pressing and deforming the diaphragm member 34. The valve seat 33 includes the first annular valve seat 331 made of fluorine resin and the second annular valve seat 332 made of heat-resistant resin, which are positioned concentrically adjacent to each other. The heat-resistant resin has a higher load deflection temperature at 1.82 MPa than the fluorine resin, measured according to ASTM D-648.

According to the fluid control valve 1 described in the above configuration (1), the sealing performance in the valve closed state is ensured mainly by the first annular valve seat 331 made of fluorine resin. This is because the first annular valve seat 331 made of fluorine resin can fit well into the contour of the diaphragm member 34 when the diaphragm member 34 contacts the valve seat 33, and exhibit good transfer property. The second annular valve seat 332, which is made of heat-resistant resin with a higher load deflection temperature than fluorine resin, is less likely to be deformed as compared with the fluorine resin even under high temperature conditions. Therefore, the second annular valve seat 332 mainly functions to receive the load applied by the diaphragm member 34. Since the second annular valve seat 332 located adjacent to the first annular valve seat 331 receives the load applied by the diaphragm member 34, even when the contacting and separating operations are repeated as above, it is possible to suppress excessive depression or collapse of the first annular valve seat 331 by the load applied by the diaphragm member 34.

In some cases, the fluid control valve 1 is subjected to an annealing treatment in the valve closed state before being used. This annealing treatment makes the contact surface 33a of the valve seat 33 fit well into or conform to the contour of the back surface 342 of the diaphragm member 34 in the valve closed state of the fluid control valve 1. Even during execution of this annealing treatment, the second annular valve seat 332 made of heat-resistant resin, together with the first annular valve seat 331, receives the load applied to the valve seat 33 while the diaphragm member 34 is in contact with the valve seat 33, so that the first annular valve seat 331 is suppressed from being excessively depressed or collapsed.

Since the depression or collapse of the valve seat 33, i.e., the first annular valve seat 331, is suppressed as above, it is possible to suppress an increase in deformation amount (the stroke distance) of the diaphragm member 34 until contacting the annular valve seat 33 due to depression or collapse of the valve seat 33 and hence prevent the deterioration in the sealing performance of the fluid control valve 1 and the fatigue failure of the diaphragm member 34.

(2) In the fluid control valve 1 described in the above configuration (1), the load deflection temperature of the heat-resistant resin at 1.82 MPa may be 125° C. or higher, as determined according to ASTM D-648.

(3) In the fluid control valve 1 described in the above configuration (1) or (2), the heat-resistant resin may be any one of polyetheretherketone (PEEK), polyetherketone (PEK), polybenzimidazole (PBI), polyimide (PI), or heat-resistant polyamide (PA).

The fluid control valve 1 configured in (2) or (3) can suppress deformation of the second annular valve seat 332 even under high temperature conditions in which the process gas temperature is 250° C. or higher. Therefore, the second annular valve seat 332 can reliably receive the load applied by the diaphragm member 34 and hence reliably prevent the first annular valve seat 331 from being excessively collapsed or depressed.

The foregoing embodiments are mere examples and give no limitation to the present disclosure. The present disclosure may be embodied in other specific forms without departing from the essential characteristics thereof. For instance, in the fluid control valve 1 in the embodiment, an air cylinder that is pneumatically activated is employed as the driving unit 2, but other driving sources, such as a direct-acting servomotor, may be used.

REFERENCE SIGNS LIST

1 Fluid control valve
32 Second stem
33 Valve seat
34 Diaphragm member
331 First annular valve seat
332 Second annular valve seat

What is claimed is:

1. A fluid control valve comprising:
a pressing member;
a diaphragm member;
a valve chamber; and
a valve seat provided in the valve chamber,
the fluid control valve being configured to press and deform the diaphragm member by the pressing member to bring the diaphragm member into contact with the valve seat,
wherein the valve seat includes a first annular valve seat made of fluorine resin and a second annular valve seat made of heat-resistant resin, which are positioned concentrically adjacent to each other,
the heat-resistant resin has a higher deflection temperature under load at 1.82 MPa than the fluorine resin, measured according to ASTM D-648, and
the first annular valve seat and the second annular valve seat are swaged and fixed to the valve chamber.

2. The fluid control valve according to claim 1, wherein the deflection temperature under load of the heat-resistant resin at 1.82 MPa is 125° C. or higher, measured according to ASTM D-648.

3. The fluid control valve according to claim 1, wherein the heat-resistant resin is polyetheretherketone, polyetherketone, polybenzimidazole, polyimide, or high heat-resistant polyamide.

4. The fluid control valve according to claim 2, wherein the heat-resistant resin is polyetheretherketone, polyetherketone, polybenzimidazole, polyimide, or high heat-resistant polyamide.

* * * * *